United States Patent [19]

Ruzicka et al.

[11] 3,926,764
[45] Dec. 16, 1975

[54] ELECTRODE FOR POTENTIOMETRIC MEASUREMENTS

[75] Inventors: Jaromir Ruzicka, Naerum; Carl Goran Lamm, Charlottenlund, both of Denmark

[73] Assignee: Radiometer A/S, Denmark

[22] Filed: May 19, 1972

[21] Appl. No.: 255,236

[30] Foreign Application Priority Data
May 19, 1971 Denmark............................ 2411/71

[52] U.S. Cl............................ 204/195 F; 204/195 M
[51] Int. Cl....................... G01n 27/30; G01n 27/46
[58] Field of Search............. 204/1 T, 195 F, 195 M

[56] References Cited
UNITED STATES PATENTS

| | | | |
|---|---|---|---|
| 1,779,232 | 10/1930 | Handforth | 204/195 F |
| 3,103,480 | 9/1963 | Watanabe et al. | 204/195 F |
| 3,607,710 | 9/1971 | Farren et al. | 204/195 M |

FOREIGN PATENTS OR APPLICATIONS

| | | | |
|---|---|---|---|
| 678,648 | 9/1952 | United Kingdom | 204/195 F |
| 603,671 | 8/1960 | Canada | 204/195 F |

*Primary Examiner*—T. Tung
*Attorney, Agent, or Firm*—Robert E. Burns; Emmanuel J. Lobato; Bruce L. Adams

[57] ABSTRACT

An electrode for potentiometric measurements. An electrochemically active redox system sensitive to ions in solution, which may be water-soluble or sparingly soluble, is carried directly by an electrical conductor such as graphite, which is rendered hydrophobic by means of a solid hydrophobizing material such as polytetrafluoroethylene. For use as reference electrode, said electrochemically active redox system contacts a solid, water-soluble salt establishing a fixed ion activity to be sensed by the electrochemical redox system. A salt bridge of another solid salt may be included. Such reference electrode may be used as inner reference in an ion-sensitive membrane electrode.

10 Claims, 11 Drawing Figures

3,926,764

ELECTRODE FOR POTENTIOMETRIC MEASUREMENTS

BACKGROUND OF THE INVENTION

1. Field of the invention.

The present invention relates to ion-sensitive electrodes and reference electrodes for potentiometric measurements. Such electrodes are usable in apparatus for potentiometric measurements and analyses.

2. Description of the prior art.

It is well known to measure the pH value of an aqueous solution by means of a glass electrode in combination with a suitable reference electrode. In similar manner, it is possible to measure the activity of other ionic species, for example $Ca^{++}$, $Na^+$, $Cl^-$ etc. in aqueous solutions by means of liquid-liquid membrane electrodes or solid state membrane electrodes. Such electrodes are described e.g. R. A. R.A. Durst (editor), Ion Selective Electrodes, NBS Spec. Publ. 314, National Bureau of Standards, Washington, 1969.

Another type of electrodes, which do not utilize membranes, but rather an electrically conductive and hydrophobized material, e.g. graphite, hydrophobized with e.g. benzene, paraffin, polytetrafluoroethylene etc. as carrier or reservoir for the electrochemically active compounds, are described in published German Patent Application (Offenlegungsschrift) No. 2,034,686 and in an article by J. Ruzicka and C. G. Lamm in Anal. Chim. Acta, 54 (1971), 1 – 12.

The above electrode types of the known art utilize, as electrochemically active material, typically chemical compounds which are sparingly soluble in water.

Several types of reference electrodes for potentiometric measurements are known. In such reference electrodes, a stable electrical potential is generated by an electrochemically active redox system, e.g. mercury calomel or silver/silver chloride, in contact with a standard solution of an ion to which said electrochemically active redox system is sensitive. In the above-mentioned German Patent Application, it has also been suggested to establish a reference electrode in which an electrochemically active substance sensitive to ions in solution and carried by a hydrophobized conductive material is exposed to a standard solution of an ionic specie to which the electrochemically active substance is sensitive.

SUMMARY OF THE INVENTION

In the electrodes of the present invention, a body of a hydrophobized electrically conductive material acts as a carrier for an electrochemically active redox system sensitive to ions in solution, and they are all characterized by containing solid water-soluble compounds.

The solid water-soluble compounds contained in the electrodes according to the present invention may function as:

A. Electrochemically active redox components sensitive to ions in solution and carried by the electrically conductive material, the identity of the water-soluble compounds being decisive for the ionic species to which the electrode (or the electrode component) constituted by the combination of hydrophobized conductive material and electrochemically active redox system is sensitive.

B. Means for maintaining in an electrode at a fixed temperature a fixed chemical activity of a ionic specie to which the electrochemically active redox system of the electrode is sensitive. Such electrodes will function as reference electrodes. The electrochemically active redox component of such electrodes may be either water-soluble or sparingly soluble.

C. Means for avoiding physical contact between a sample solution and components determining the potential of a reference electrode. Here, the water-soluble compound will serve as a salt bridge.

DETAILED DESCRIPTION OF THE INVENTION

An important embodiment of the present invention is a reference electrode comprising a. An electrochemically active redox system sensitive to ions in solution, b. a body of an electrically conductive material hydrophobized with a solid hydrophobizing material and electrochemically substantially inert under electrode working conditions, said body acting as a carrier for said electrochemically active redox system, c. a humid solid, water-soluble compound which is able to dissociate with liberation of a ionic specie to which the electrochemically active redox system is sensitive, said humid compound being present in contact with the electrochemically active redox system in such amount that it establishes, at a fixed temperature, a fixed activity of the ionic specie said activity being sensed by the electrochemically active redox system, and d. means permitting electrolytical communication and limited moisture communication between a humid solid water-soluble compound in the electrode and an exterior sample solution.

In the present specification and claims, the term "electrochemically active redox system sensitive to ions in solution" is intended to designate a mixture of chemical components in mutual redox equilibrium, one of the components being in ionic equilibrium with an ionic specie, the electrical potential generated by the system being dependent on the activity of said ionic specie. The said chemical components may be chemical compounds, or one of the components may be a chemical element. Such redox systems are well-known in the reference electrode art, and as typical examples may be mentioned mercury/calomel ("calomel paste") which is sensitive to chloride ions, mercury/mercurous sulfate, which is sensitive to sulfate ions, silver/silver chloride, which is sensitive to chloride ions, and quinhydrone (mixture of benzoquinone and benzohydroquinone), which is sensitive to hydrogen ions, in other words, pH sensitive.

The term "electrochemically substantially inert under electrode working conditions" as used about the electrically conductive material is intended to indicate that this material does not to any substantial extent chemically react with the components to which it is exposed to establish any contribution to the potential generated by the electrode. In other words, the material, although usually exposed to the humid water-soluble compound, is shielded against contact with the salt or ions thereof by means of the hydrophobizing material, so that it merely acts as a conductor establishing the connection between a lead connectable to a potential measuring apparatus and the electrochemically active redox system carried or supported by the material. The electrically conductive material preferred for the purpose of the present invention is carbon, in particular graphite, especially porous graphite. Other materials believed to be especially suitable are the so-called "polymer carbons", e.g. preoxidized polydivinylbenzene pyrolyzed at about 1000°C, or pyrolyzed nylon.

The term "hydrophobizing material" is intended to define a material which imparts long-lasting hydrophobic properties to the conductive carrier material, and such hydrophobizing materials are predominantly organic substances or substances of similar character. As examples of solid hydrophobizing materials may be mentioned thermoplastic polymers such as polyethylene and in particular, polytetrafluoroethylene (e.g. Teflon). The hydrophobizing material should, of course, be present at any surface of the electrode body adapted to be physically contacted with an aqueous solution.

The term "porous", as here used in connection with the body of electrically conductive material, includes also bodies prepared by any particle aggregation technique, such as sintering or pressing, resulting in aggregated bodies wherein electrical contact exists between the particles so as to make the resulting body electrically conductive. It is essential to note that the term "porous" in the broad sense here used refers to the electrically conductive material, not necessarily to the finished hydrophobized body which, due to presence of hydrophobizing material and/or electrochemically active redox system throughout the porous structure, may appear as a substantially non porous body, and indeed, very preferred hydrophobized electrode bodies appear as substantially non-porous bodies comprising a mixture of e.g. polytetrafluoroethylene and graphite particles distributed in mutual contact within the bodies. The electrical conductivity of the hydrophobized body may be varied within wide limits to adapt the conductivity optimally to any given end use purpose, simply by varying the relative amounts of hydrophobizing material and conductive material.

The terms "carrier" and "carry" as used in connection with the arrangement of the electrochemically active redox system on the body of electrically conductive material are herein intended to indicate that the active redox system is in electrical contact with the electrically conductive material and is present in a revelant domain of the electrode body, that is, a zone throughout the body or a surface, positioned so that the active redox system will communicate with and contact the solution to the ions of which the active substance is sensitive. The redox system will usually be present in porosities of the body and in some cases throughout the porous structure of the body, but it is preferred that the part of the body in which a lead to a potential measuring is to be inserted is free of any electrochemically active material.

The humid solid, water-soluble compound which is able to dissociate with liberation of an ionic specie to which the electrochemically active redox system is sensitive may be a salt of the ionic specie concerned. Thus, when the electrochemically active redox system is mercury/mercurous chloride, the salt will be a water-soluble chloride salt, typically potassium chloride. When the electrochemically active redox system is mercury/mercurous sulfate, the salt will usually be sodium sulfate. When the electrochemically active redox system is silver/silver chloride, the salt will usually be potassium chloride, preferably admixed with silver chloride to form a paste such as is common in connection with conventional silver/silver chloride reference systems. As the water-soluble compound is present in solid, but humid form and contacts the electrochemically active redox system, the redox system will be exposed to an ionic activity of the ion to which it is sensitive corresponding to the activity of a saturated solution thereof, and, hence, the potential generated by the redox system will be stable and constant at any given temperature. The fact that only small amounts of water are present (the term "humid" is intended to designate that there is never more than 10% of free water present, calculated on the total amount of water-soluble material, and usually, the amount of water present is considerably less than 10%), the redox system will be exposed to saturation activity of the ionic specie at any given operating temperature, and the equilibration to saturation activity during temperature cycling will be fast, thus eliminating temperature hysteresis problems.

When the electrochemically active redox system is pH sensitive, the humid solid, water-soluble compound will be an acid, and the stability of the hydrogen ion activity to be sensed by the pH sensitive redox system is obtained by means of a salt which together with the acid forms a buffer system. As an example of such a buffer system may be mentioned an equimolar mixture of oxalic acid and monosodium oxalate.

The above-mentioned combinations of electrochemically active redox systems and water-soluble compounds for establishing reference electrodes according to the invention are to be understood as examples of usable combinations, and indeed, any other such combination which is usable in connection with conventional reference electrodes is also usable in the electrode according to the present invention. An extensive listing of such combinations is found in "Reference Electrodes, Theory and Practice", edited by David J. G. Ives and George J. Janz.

In principle, any reversible redox system sensitive to ions in solution and exposed to a fixed and stabilized activity of the ionic specie to which it is sensitive will be usable as working principle in the present reference electrode.

The means permitting electrolytical communication between a solid water-soluble compound in the electrode and an exterior sample solution may be any suitable means for establishing a junction. For example, the means may be a porous glass plug through which a limited moisture connection with an exterior sample solution is possible, or it may be for example, porous TEFLON, or the communication may be through a so-called "sleeve junction" of the type described e.g. in U.S. Pat. No. 3,492,216. As will be explained further below, also a surface of a porous tablet containing the water-soluble compound may function as the means permitting electrolytical communication between the water-soluble compound in the electrode and an exterior sample solution.

In the reference electrode according to the invention a salt bridge may, like in conventional reference electrodes, be inserted between the water-soluble compound communicating with the redox system and the junction to the exterior sample solution to avoid contact between the said water-soluble compound and the sample solution. In the electrode according to the invention, such salt bridge may conveniently consist of a humid solid water-soluble salt which communicates electrolytically with the above water-soluble compound.

A reference electrode system of the type described above may be used as inner reference system in an ion-sensitive membrane electrode. The membrane may consist of or contain a sparingly soluble compound showing specific ion response, for example a sparingly soluble solid salt or a liquid ion exchanger or other liquid ion-sensitive material, examples of which are stated in the above-mentioned German published Patent Application No. 2,034,686. In such case, the water-soluble component of the reference electrode communicating electrolytically with the electrochemically active substance of the membrane will be a compound dissociable to an ion to which the sparingly soluble compound in the membrane is sensitive.

The electrical potentials generated by the electrodes according to the invention may be measured or recorded in a conventional manner by establishing electrical contact between the electrically conductive material of the electrode body and suitable potential measuring apparatus.

DETAILED DESCRIPTION OF THE DRAWINGS

Figure 1:
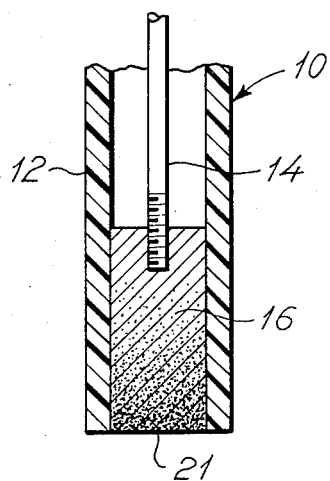
FIGS. 1 – 9 are diagrammatic representations of exemplary embodiments of electrodes according to the principles of the present invention.

Referring to the drawings where like numerals designate like elements, there will be seen in FIG. 1 a specific embodiment of an ion-sensitive electrode 10 of the present invention and comprising electrically-insulating container means such as a tube 12 of an inert material, for example glass or an organic polymer, e.g. Teflon or polyethylene. An electrically conductive lead 14 for connection with a potential measuring apparatus, e.g. via conventional wiring, is inserted in an electrode body 16 consisting of e.g. porous graphite hydrophobized with polytetrafluoroethylene, polyethylene, paraffin or another solid water-insoluble hydrophobizing material and containing, at an active surface 21 and also disposed throughout the body in graded concentration, such as indicated in the drawing, an electrochemically active redox system sensitive to ions in solution, e.g. quinhydrone or thymoquinhydrone. In the embodiment shown, the electrode body 16 contains no electrochemically active material in the part in which the lead is inserted, and it is generally preferred that the electrode bodies used in the present electrode are free of electrochemically active material in the parts thereof in which the leads are inserted. However, in many cases the presence of electrochemically active material in contact with the lead would not seriously impair the electrode function, provided that the lead consists of a material which is chemically inert to the electrochemically active material. In cases where the electrochemically active material would tend to corrode or otherwise react with the lead, the electrochemically active material should be so positioned that it will not contact the lead. This may be obtained either by dispersing the electrochemically active material with a concentration gradient, such as indicated in FIG. 1, or by dispersing it in substantially uniform concentration in a limited zone adjacent to and comprising the surface 21 of the electrode body. The electrode body is arranged in the tube 12 in such a manner that only the desired surface 21 of the electrode body is exposable to a sample solution. Because of the simple cylindrical form of the electrode body and the hydrophobization, sealing problems are easily avoided.

The electrode body 16 may be prepared by mixing the desired components, for example graphite powder, polytetrafluoroethylene powder and quinhydrone, the latter being arranged in the desired manner, for example in a maximum concentration at the active surface 21 and a decreasing concentration towards the other end of the electrode body, and compressing the mixture.

Figure 2:
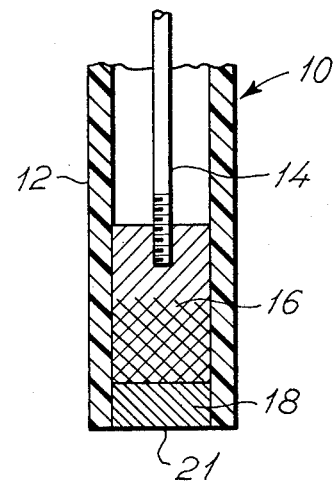

FIG. 2 shows a reference electrode according to the invention. In the electrode body 16 of e.g. graphite hydrophobized with polytetrafluoroethylene, an electrochemically active redox system is disposed in graded concentration or in a zone of the body, such as indicated in the drawing. Below the electrode body 16 and in contact with the electrochemically active redox system at the surface thereof is disposed a circular cylinder or tablet 18 of porous hydrophobizing material, preferably porous tetrafluoroethylene, containing in porosities thereof a humid, solid water-soluble compound which is able to dissociate with liberation of an ionic specie to which the electrochemically active redox system in the electrode body 16 is sensitive. For example, the electrochemically active redox system in the electrode body 16 is quinhydrone, and the water-soluble compound contained in the tablet 18 and contacting the quinhydrone is oxalic acid, which is present in admixture with sodium oxalate. The porous surface 21 of the tablet 18 serves as the means permitting electrolytical communication between the oxalic acid and the exterior sample solution. As another example, the electrolytically redox system in the electrode body 16 is calomel paste, the humid solid water-soluble compound in the tablet 18 is potassium chloride. The tablet 18 may be prepared by compressing a powder mixture of the hydrophobizing material, preferably polytetrafluoroethylene, and the solid water-soluble compound. Preferably, the solid water-soluble compound is in humid state prior to the compressing operation, but it is also possible to humidify the compound after the compressing, for example by dipping the tablet into a saturated solution of the compound.

The electrode body 16 and the tablet 18 shown in FIG. 2 could also be unified so as to form together a coherent unitary body showing the same characteristics and having the contents of the separate units 16 and 18. In other words signs shown in the units 16 and 18 in FIG. 2 could designate zones in the coherent unitary body. Such a coherent unitary body may be prepared by compressing a powder mixture in which the various components are arranged in the desired order and concentration.

Figure 3:
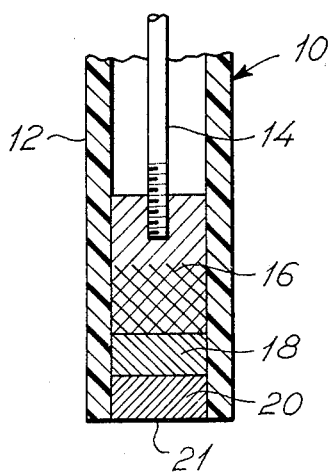

In the electrode embodiment shown in FIG. 3, a further layer 20 has been included. In this embodiment, the humid solid water-soluble compound in the layer 18 may be present either in a tablet of porous solid hydrophobizing material, or it may simply, and preferably, be present in the form of a humid crystal powder. The tablet 20 may be a porous tablet of solid hydrophobizing material, the pores of which serve as means permitting electrolytical communication between the water-soluble compound in the layer 18 and an exterior sample solution to which the lower surface 21 of the tablet is exposable, or the tablet 20 may contain, in the porosities thereof, a further amount of the same solid water-soluble compound as is present in the layer 18. Alternatively, the tablet 20 may, in an important embodiment of the electrode, contain, in the porosities thereof, a humid solid water-soluble salt different from the compound in the layer 18 and serving as salt bridge between the compound in the layer 18 and the exterior sample solution, communicating with the sample solution through the porous surface 21 permitting electrolytical communication with the sample solution. For example, the redox system in the body 16 could be mercury/calomel, the water-soluble compound in the layer 18 could be potassium chloride, and the salt bridge in the tablet 20 could be constituted by potassium nitrate. Other interesting combinations are mercury/mercurous sulfate in the body 16, sodium sulfate in the layer 18, and potassium nitrate in the tablet 20, and quinhydrone in the body 16, an equimolar mixture of oxalic acid and sodium oxalate in the layer 18, and sodium nitrate as salt bridge in the tablet 20. The units 16, 18 and 20 shown in FIG. 3 could also be unified so as to form a coherent unitary body, in which case the water-soluble compound of the layer or zone 18 would be contained in a porous zone of solid hydrophobizing material analogously to the arrangements of the salt bridge in the zone 20.

Figure 4:
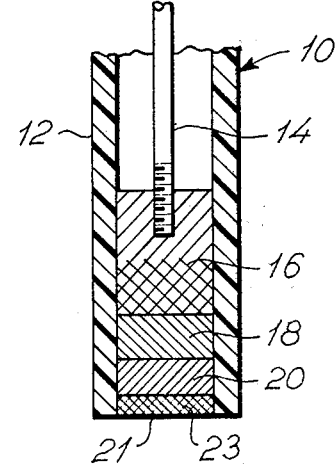

In FIG. 4, a further layer 23 has been added below the layer 20. 23 may be a porous body of solid hydrophobizing material such as polytetrafluoroethylene serving as means permitting electrolytical communication between the water-soluble salt of the salt bridge in layer 20. In this case, the salt in layer 20 may be present as a humid powder mass, and layer 18 will then be a tablet of porous hydrophobizing material containing in the porosities thereof the humid solid water-soluble compound cooperating with the redox system in the body 16 to establish the electrode potential. The units 16 and 18 may also be present as a coherent unitary body having the corresponding zone distribution. Of course, 20 may also designate a porous tablet of solid hydrophobizing material, in which case the layer 23 could consist of porous hydrophobizing material alone, or 23 could designate a zone of a tablet 20 in which the hydrophobizing material is admixed with solid conductive inert material such as graphite to decrease the ohmic resistance of the electrode. In any electrode embodiment according to the present invention, it is possible to add graphite or another inert conductive material to one or more of the layers in order to reduce the ohmic resistance, but it must be noted that any conductive material in the layer 18 must never be allowed to contact the electrochemically active redox system.

Figure 5:
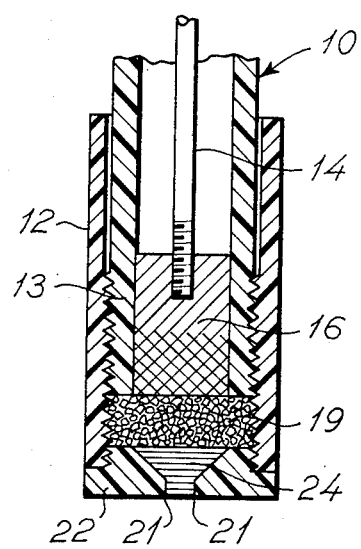

FIG. 5 shows an interesting practical embodiment of the reference electrode according to the invention. In this embodiment a jacket 13 is screwed on the tube 12 and closed by a cap 22 in which a plug 24 is inserted. The humid solid water-soluble compound contacting the electrochemically active redox system in the body 16 is present as a humid powder mass 19. For example, the electrode body 16 may contain, as electrochemically active redox system, calomel paste, the domain around the lead 14 being free of calomel paste. The humid powder mass 19 consists of humid potassium chloride. The plug 24 may be a porous plug permitting electrolytical communication between the potassium chloride and an exterior sample solution, for example a porous glass plugg or a porous teflon plug, or the plug may be non-porous, the junction between the potassium chloride 19 and an exterior sample solution being established as a sleeve type junction at a narrow interstice between the plugg wall and the cap. For this purpose the plug may conveniently consist of polytetrafluoroethylene admixed with glass so as to obtain more rough plug walls. The electrode embodiment shown in FIG. 5 is thus considerably advantageous compared to conventional reference electrodes: the construction is simple and robust, and the active parts of the electrode take up little height so that they may be totally immersed during use of the electrode, thus avoiding temperature gradient problems. Also, it is very easy to add fresh solid water-soluble compound, and the electrochemically active surface of the electrode body may be renewed by simply cutting off a thin slice.

In all the reference electrodes discussed above, combinations of the electrode body with separate tablets could be substituted with porous unitary bodies comprising the corresponding zones.

In the above reference electrodes, it is preferred that the level of humidity, although never very high, is such that a possible moisture flow during use of the electrode immersed in a sample solution is directed from the inside of the electrode towards the sample solution, as a flow in the opposite direction would tend to contaminate the electrode with the sample solution.

In the preparation of the abovementioned porous tablets of solid hydrophobizing material containing solid water-soluble compound in the porosities, the volume ratio between solid water-soluble compounds and solid hydrophobizing material (or hydrophobizing material admixed with conductive material) will usually not exceed 2:1. The same applies for the preparation of the corresponding zones of a coherent unitary multifunctional body.

The compounds here designated as water-soluble compounds will usually have a solubility in water, at room temperature, of at least 1 gram per litre.

Figure 6:
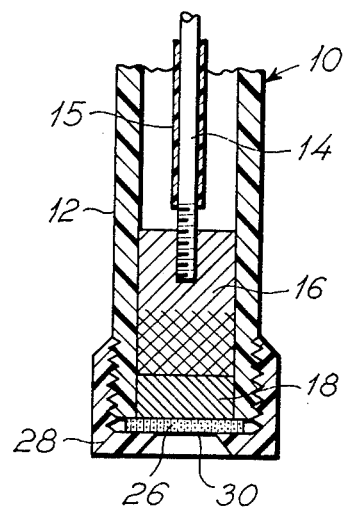

FIG. 6 shows an embodiment of an ion-selective electrode according to the present invention. The lead 14 is insulated by means of a jacket 15, and a membrane 26 consisting of or containing water-insoluble liquid or solid substance showing specific ion response is inserted bolow the layer 18 and secured by means of a cap 28 having a central hole. The active surface 30 of this electrode response to specific ion species of the sample solution, in accordance with the selectivity of the active substance of the membrane. The opposite surface of the membrane contacts and communicates with the humid solid water-soluble compound (in the layer 18), which together with the redox system in the body 16 establishes an interior reference component of the ion-selective electrode. The compound in layer 18 must be so chosen that one of the ions generated by its dissociation is an ion specie to which the active substance of the membrane is sensitive. For example, the electrochemically active substance present in the membrane may be the calcium salt of diphenylphosphoric acid, dihexylphenylphosphoric acid or dioctylphenylphosphoric acid, all of which are sensitive to $Ca^{++}$ ions. A suitable inner reference system for these membrane substances is mercury/calomel as electrochemically active redox system and $CaCl_2$ as humid solid water-soluble compound in the layer 18. Of course, the inner reference system could comprise more layers such as explained in connection with FIGS. 3 and 4, but it is conditional that the layer immediately adjacent to the membrane comprises a compound which is able to dissociate with the liberation of an ionic specie to which the membrane active substance is sensitive.

Figure 7:
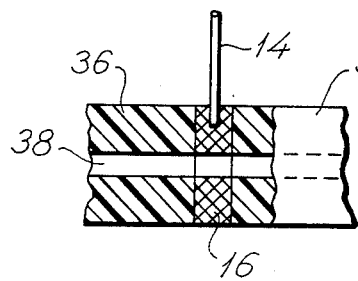
Figure 7A:
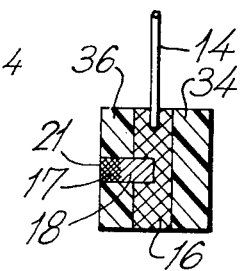

FIG. 7 illustrates a flow-through pH-sensitive electrode according to the present invention. A tube is constituted by parts 34 and 36 consisting of polytetrafluoroethylene together with the body 16 which in this embodiment has an annular shape. When the electrode is in use, the sample solution passes through a bore 38. Several such flow-through ion-sensitive electrodes could be combined in one tube, each being sensitive to a particular ion specie. FIG. 7a shows a cylindrical reference electrode usable in connection with the flow-through electrode of FIG. 7 and adapted to be arranged at an end of a flow-through type electrode or electrode series, the current of the sample solution passing the surface 21. In the embodiment shown in FIG. 7a, 18 is a cylindrical body of porous hydrophobizing material containing in porosities thereof and in contact with the electrochemically active redox system of the electrode body 16 the humid solid water-soluble compound, the hydrophobizing material in a zone of the unit 18 adjacent to the surface 21 being admixed with e.g. graphite to reduce the ohmic resistance of the electrode.

Figure 8:
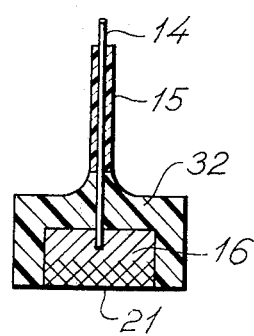

FIG. 8 shows a pH-sensitive button-type electrode according to the invention. Instead of a tube, a bell-shaped body 32 is used as support for the body 16 comprising quinhydrone or thymoquinhydrone as electrochemically active redox system.

Figure 9:
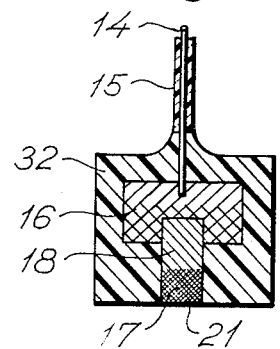

FIG. 9 shows a button-type reference electrode according to the invention, the arrangement and composition of the active principles being similar to FIG. 7a.

The invention is further illustrated through the following non-limiting examples:

EXAMPLE 1

A pH-sensitive quinhydrone electrode was prepared by mixing quinhydrone (equimolar mixture of benzoquinone and benzohydroquinone) and graphite hydrophobized by Teflon in a weight ratio of 1:3, milling and then forming the electrode body by pressing graphite hydrophobized by Teflon and the above mixture with quinhydrone in such a way (shown in FIG. 1) that the hydrophobized graphite alone was surrounding the contact or lead (14) and its mixture with quinhydrone was present at the electroactive surface facing the sample solution. The part of the electrode body containing quinhydrone was sufficiently long to allow the renewing of the surface by cutting off a thin slice of the electrode body many times. Polishing the electroactive surface after each cutting ensured fast response of the electrode (stable potentials of the electrode were reached in less than 30 sec.).

Figure 10:
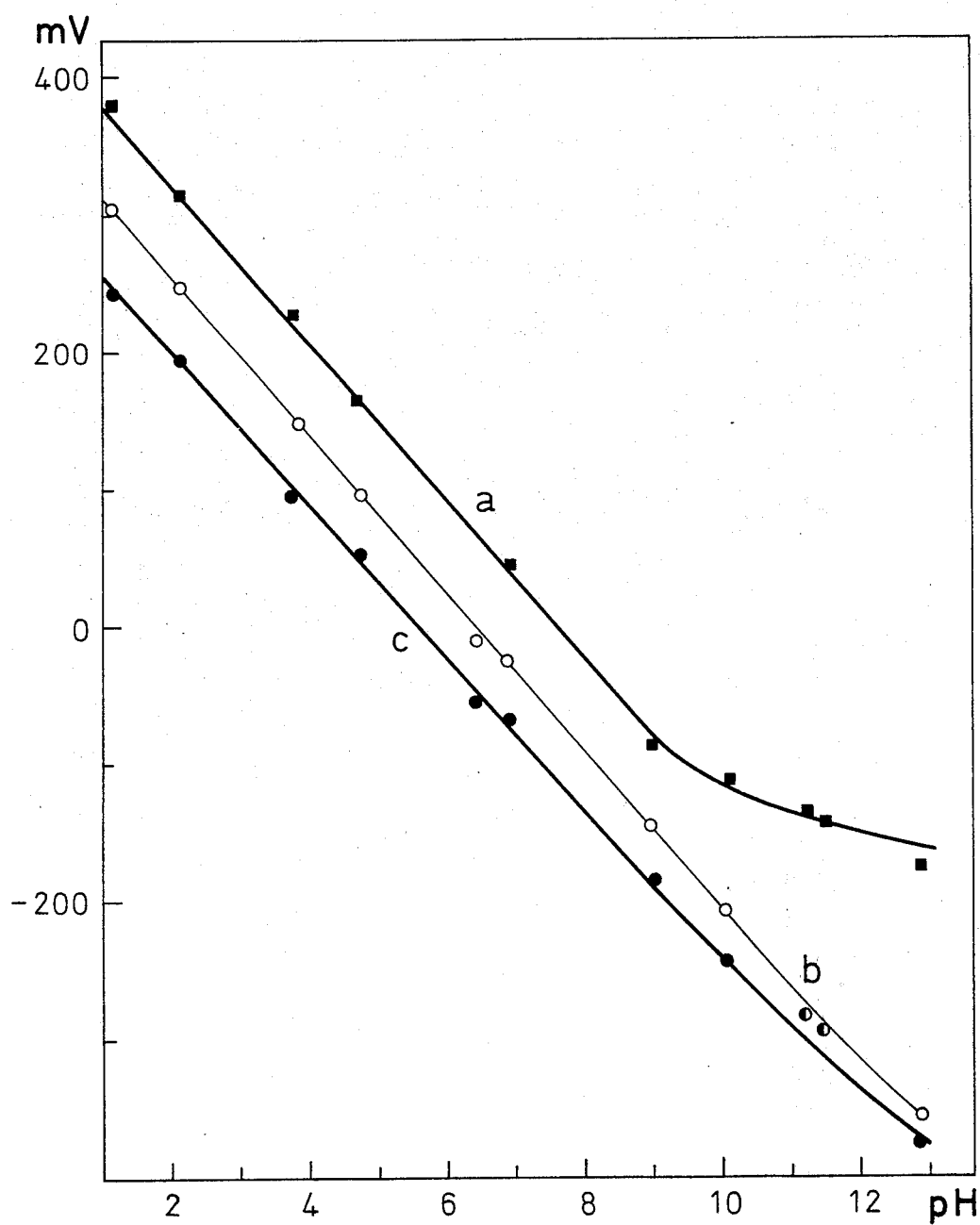
FIG. 10 is a graphical representation showing the response, in term of potential, of a pH-sensitive electrode or electrode component according to the present invention when exposed to sample solutions of varying pH value.

FIG. 10, curve $a$ shows the electrode potentials as function of pH in a series of NBS standard buffer solutions versus saturated calomel electrode. For comparison purposes, the corresponding response of a commercial glass electrode is shown as curve $b$. Non-equimolar mixtures of benzoquinon and benzohydroquinon gave similar response.

EXAMPLE 2 pH-Sensitive thymoquinhydrone electrodes were prepared by mixing thymoquinhydrone (equimolar mixture of 2,5-p-cymenediol and its corresponding quinone) and graphite hydrophobized by Teflon in weight ratio 1:2 and milling. The electrode body was prepared as described in Example 1, and the electrode function is shown in FIG. 10, curve $c$. Contrary to the quinhydrone electrode, this electrode can also be used in alkaline solutions.

EXAMPLE 3 pH-Sensitive flow-through electrodes based on the same materials as in Examples 1 and 2 are pure Teflon powder were prepared by pressing a cylinder as shown in FIG. 7, and by boring a hole through the axis of the cylinder. A sample solution thus comes into contact with the pH-sensitive surface, when passing through the electroactive layer.

The pH-sensitive surface was renewed by redrilling the hole. The potential pH response of this electrode versus a saturated calomel electrode was the same as that shown in FIG. 10.

EXAMPLE 4 pH-Sensitive button-type electrodes based on the same materials as in Examples 1 and 2 were prepared by pressing the mixtures of graphite hydrophobized with Teflon and the electroactive material and pure Teflon powder as shown in FIG. 8.

The figure also shows the insulated contact cable, the end of which has been brought in direct electrical contact with the graphite hydrophobized with Teflon during the pressing of the electrode.

These button-type electrodes exhibited the same response as shown in FIG. 10 and have been used to measure soil pH "in situ" in combination with button-type reference electrode (see Example 5). These direct measurements of pH in soil were carried out for a 5 weeks period, followed by a recheck of the electrode pairs by means of NBS standard buffer solutions, and it was found that the electrode response remained preserved.

EXAMPLE 5

Quinhydrone reference electrodes were prepared in the following manner:

1. The electrode was made according to FIG. 2, where a layer 16 was made to contain a mixture of quinhydrone ($x$), an equimolar mixture ($y$) of solid oxalic acid and monosodium oxalate and graphite hydrophobized with Teflon ($z$) in the weight ratios $x:y:z = 2:1:4$. $x$ and $y$ were milled together prior to mixing with $z$. Layer 18, as shown in FIG. 2 functioning as a salt bridge, was made to contain a mixture of milled solid potassium nitrate and pure Teflon in weight ratio 1:5. The electrode body consisting of layers 16 and 18 in FIG. 2 was pressed in one operation as a coherent unitary body and mounted in tube 12, and the contact 14 was screwed into the body as shown in FIG. 2.

This electrode had a potential of +318 mV vs. a saturated calomel electrode, i.e. +550 mV vs. a standard hydrogen electrode. This potential remained substantially unaffected by changes of pH in the sample solution from pH 1 to pH 13 and by presence of various redox couples.

2. In order to delay any loss of the salt bridge, i.e. potassium nitrate in the above example 5 1), an electrode configuration as shown in FIG. 3 was made, where the layers 16 and 18 were identical with the same layers as in example 5 1), and layer 20 consisted of pure Teflon. Layers 16, 18 and 20 were pressed in one operation to form a coherent unitary body. Prior to mounting of the electrode body in the tube 12, it was placed in a saturated potassium nitrate solution.

Again, the potentials exhibited were as those stated under Example 5 1), but the electrode had a higher ohmic resistance than the reference electrode prepared as example 5 1).

3. In order to obtain a quinhydrone reference electrode with low ohmic resistance suitable in e.g. flow-through systems, the pure Teflon of the salt bridge layer 18 in FIG. 2 was replaced with graphite hydrophobized by Teflon. For continuous flow-through systems this reference electrode was shaped as shown in FIG. 7 a where a layer identical with layer 16 in Example 5 1) separated two layers of pure Teflon. The salt bridge 18 consisted of a mixture of milled, solid potassium nitrate and graphite hydrophobized with Teflon in the weight ratio 1:3. This electrode was made by pressing the layers in one operation, drilling a hole along the cylinder axis as shown in FIG. 7 a and tightly filling this hole with the mixture layers.

4. A button-type quinhydrone reference electrode suitable for e.g. soil or oceanographic measurements "in situ" was prepared from the same materials and by similar processes as the reference electrode in Example 5 3) as shown in FIG. 9. The potential of this electrode was found to be constant and independent on the composition of the sample solution as stated in example 5 1).

All quinhydrone reference electrodes described under Example 5 function because (a) the inner pH is fixed by the oxalic acid monosodium oxalate at pH 1,9 (compare curve a, FIG. 10), (b) the humidity introduced by soaking the electrode or during the making of the electrode results in small amount of saturated solutions at the hydrogen ion sensing surfaces and throughout the salt bridge layer. In the case of the pure Teflon layer 20 (FIG. 3) a sleeve type function in the interstice between 20 and 10 was established. The potential of this electrode was found to be constant and independent on the composition of the sample solution as stated in Example 5 1).

EXAMPLE 6

Thymoquinhydrone reference electrodes containing the same materials and having the same shapes as in Example 5, but with quinhydrone replaced by thymoquinhydrone were prepared.

They all exhibit a constant potential of 196 mV vs. saturated calomel electrode, i.e. +437 mV vs. standard hydrogen electrode. This potential was independent on the composition of the sample solution as stated in Example 5 1).

EXAMPLE 7

Calomel reference electrodes were prepared having the same physical shapes, i.e. dip-type, flow-through measurement type and button-type, by using the following materials:

A calomel paste was prepared in the usual way by mixing e.g. 0.1 gram mercury, 1 gram mercury (I) chloride and 1 gram potassium chloride. This dry mixture was humidified with saturated potassium chloride solution to obtain a paste, which was subsequently dried and mixed with graphite hydrophobized with Teflon at a weight ratio 1:2. This mixture hereafter referred to as the paste material.

All these electrode types were prepared in such a way that the electrode lead (14) was in electrical contact either with the paste material or — preferably — with pure graphite hydrophobized with Teflon, which was then in direct contact with the paste material.

The paste material was always in direct contact with the bridge material. This bridge material was either solid, milled potassium chloride mixed with pure Teflon in weight ratio 1:8 or solid, milled potassium nitrate mixed with pure Teflon in weight ratio 1:5.

The bridge material was in direct contact with the sample solution.

These electrodes all exhibited a potential of +241 mV vs standard hydrogen electrode independent on the composition of the sample solution as stated in example 5 1).

In order to delay any losses of bridge salt the dip type reference electrode was furnished with another layer of pure Teflon separating the bridge material from the sample solution. The electrical contact is here established along a sleeve type junction as in Example 5 2).

For e.g. continuous flow systems, where low ohmic resistance of the electrodes is essential, the bridge material was made to contain a mixture of salt and graphite hydrophobized with Teflon in weight ratios approx. 1:2. These electrodes had the same potentials and stabilities as stated above. Thus, a button-type calomel reference electrode employing potassium chloride and graphite hydrophobized with Teflon as bridge material the graphite, however, not contacting the redox system of body 16, kept its reference potential unaltered after having been placed in a soil "in situ" for two months.

All calomel reference electrodes shown here function because the inner chloride ion activity is fixed in the saturated salt solution formed by the humidity introduced during the process of making the electrode.

EXAMPLE 8

Mercury (I) sulfate saturated reference electrodes were prepared as described in Example 7 by replacing calomel with mercury (I) sulfate and potassium chloride with sodium sulfate. The potential of these electrodes was +399 mV vs. saturated calomel electrode, i.e. +640 mV vs. standard hydrogen electrode. Again this potential remained unaltered by changes of the composition of the sample solution.

What we claim is:

1. An electrode for potentiometric measurements comprising,
   A. An electrically conductive body which comprises a mixture of graphite and a thermoplastic polymer hydrophobizing said graphite,
   B. A solid electrochemically active ion-sensitive redox system in contact with said hydrophobized graphite,
   C. A solid water-soluble compound which is dissociable with liberation of an ionic specie to which the redox system is sensitive, said solid compound being humid and being present in contact with said system, and
   D. Means permitting electrolytical communication and limited moisture communication between the solid humid water-soluble compound in the electrode and an exterior sample solution.

2. An electrode according to claim 1, wherein the thermoplastic polymer is polytetrafluoroethylene.

3. An electrode according to claim 1, wherein the solid water-soluble compound (C) is present as a humid powder mass.

4. An electrode according to claim 1, wherein the solid water-soluble compound is present in a porous tablet of solid hydrophobizing material.

5. An electrode according to claim 4, wherein the solid hydrophobizing material is polytetrafluoroethylene.

6. An electrode according to claim 4, wherein the porous tablet has a surface exposable to an exterior sample solution, said surface constituting the means permitting electrolytical communication and limited moisture communication between the water-soluble compound and the exterior sample solution.

7. An electrode according to claim 1, additionally comprising a solid humid water-soluble salt positioned between the solid humid compound and said communication means and functioning as a salt bridge.

8. An electrode according to claim 1, wherein the redox system comprises mercury/mercurous chloride, and the solid water-soluble compound is potassium chloride.

9. An electrode according to claim 1, wherein the redox system comprises silver/silver chloride, and the solid water-soluble compound is potassium chloride.

10. An electrode for potentiometric measurements comprising,
   A. An electrically conductive body which comprises a mixture of graphite and a thermoplastic polymer hydrophobizing said graphite,
   B. A solid electrochemically active ion-sensitive redox system in contact with said hydrophobized graphite,
   C. A solid water-soluble compound which is dissociable with liberation of an ionic specie to which the redox system is sensitive, said solid compound being humid and being present in contact with said redox system, and
   D. An ion-selective membrane contacting the solid water-soluble compound.

* * * * *